United States Patent
Raley et al.

[11] 3,894,827
[45] July 15, 1975

[54] METHOD AND APPARATUS FOR EMBOSSING PLASTIC FILM

[75] Inventors: Garland E. Raley; James K. Rutherfoord, both of Terre Haute, Ind.

[73] Assignee: Ethyl Corporation, Richmond, Va.

[22] Filed: Mar. 28, 1973

[21] Appl. No.: 345,486

[52] U.S. Cl. .............. 425/363; 425/384; 425/394
[51] Int. Cl. ...................... B29c 15/00; B29d 7/22
[58] Field of Search .......... 425/384, 385, 363, 394, 425/383, DIG. 13, DIG. 39; 264/284, 322; 34/152, 160; 219/388

[56] References Cited
UNITED STATES PATENTS

| | | | |
|---|---|---|---|
| 2,490,781 | 12/1949 | Cloud | 53/28 |
| 2,567,275 | 9/1951 | Colombo | 264/284 |
| 2,928,124 | 3/1960 | Hugger | 264/284 |
| 3,012,335 | 12/1961 | Allander et al. | 34/160 X |
| 3,074,179 | 1/1963 | Stelling | 34/160 |
| 3,208,898 | 9/1965 | Chavannes et al. | 156/498 |
| 3,309,452 | 3/1967 | Yumoto et al. | 264/284 |
| 3,539,423 | 11/1970 | Simison et al. | 425/384 X |

*Primary Examiner*—Francis S. Husar
*Assistant Examiner*—R. J. Charvat
*Attorney, Agent, or Firm*—Donald E. Johnson; John F. Sieberth; David L. Ray

[57] ABSTRACT

A method and apparatus for embossing thermoplastic material, particularly thin, flexible, thermoplastic film. A length of preformed thermoplastic film is fed through a zone of heated air to raise the temperature of the film above its softening point. The zone of heated air is provided by two opposed hot air ovens having external means for heating and recirculating air through the ovens. After the film exits from the hot air ovens, it is fed between opposed, counter-rotating, embossing rolls thereby embossing a pattern onto the film. The rolls are cooled to fix the embossed pattern onto the film. The embossed film has little or no tendency to curl, has good moduli, low surface gloss or light reflectance, deep embossed pattern, high tensile strength and high impact strength.

14 Claims, 6 Drawing Figures

METHOD AND APPARATUS FOR EMBOSSING PLASTIC FILM

BACKGROUND OF THE INVENTION

1. Field of the Invention

This invention relates to an apparatus for producing embossed thermoplastic materials, particularly thin, flexible, thermoplastic films.

2. Description of the Prior Art

Embossed plastic film or sheet material has come into widespread use in many fields. One particularly large scale use of embossed thermoplastic sheet material is that of disposable articles such as hospital pads and drapes, wearing apparel and disposable diapers. Embossed film is also finding increased use in the packaging field, for example, as bags and overwraps for articles such as clothing, etc., and for shopping bags. In order to fulfill the requirements established by the end use of embossed film, it is desirable that the film have little or no tendency to curl when run through fabricating machines, particularly those used for manufacture of disposable clothing articles, e.g., diapers. In some cases, it is important that the embossed thermoplastic film be very soft and flexible and have the proper pattern and embossment depth in order to provide the desired "hand" or clothwise feel for the thermoplastic embossed material. Additionally, for many uses it is desired that the embossed thermoplastic material have as low a surface gloss as possible in order to simulate woven, clothlike fabrics. Further, embossed thermoplastic materials must meet the minimum physical requirements necessary for the films to be handled in high speed, automatic, fabricating machinery, i.e., it should have suitable modulus, tensile strength and impact strength.

Heretofore, embossed thermoplastic films such as polyethylene, polypropylene, polybutene-1, polyvinyl chloride and other flexible thermoplastics normally extruded into film have been made by various methods. One method used to prepare embossed thermoplastic film is to extrude the thermoplastic material, e.g., polyethylene, from a conventional slotted extrusion die onto a continuously moving, smooth, cooled, casting surface, e.g., a chill roll. The engraved pattern may be applied to the chill roll and the film pressed to the roll while in the amorphous or molten stage by press rolls. Alternatively, the chill roll may be very smooth, and the desired pattern in the film may be impressed into the film on the chill roll by means of an engraved or machined embossing roll which is pressed against at the film and the chill roll to impress the pattern into the film as it is cooled on the chill roll. The softness of embossed polyethylene film produced by chill casting is directly related to the density of the polyethylene resin used. In order to obtain different degrees of softness or stiffness, it is necessary to use a number of different polyethylene resins having different densities. Thus, if it is desired to produce a relatively stiff embossed film, it is necessary to use more expensive polymers having high densities as the feed material to the slot die. Additionally, it is difficult to change many of the physical characteristics desired in the film when using the foregoing slot die-chill cast roll embossing technique. The embossed film made by the above described process often produces poor roll conformation, i.e., they have hard or soft spots, wrinkle or sag due to the inability to distribute zones of thickness variation in the film across the width of the roll of embossed film. Embossed film rolls of poor conformation produce problems when running the film through fabricating machines or through a film printing apparatus. An example of a method and apparatus for prouducing film according to the foregoing slot die-chill cast roll technique is shown in U.S. Pat. No. 3,374,303.

Other apparatuses used for embossing plastic films heretofore have utilized a heated, engraved, embossing roll used in conjunction with a backup roll. The preformed strip of thermoplastic film, normally at room temperature, is passed between the nip of a heated engraved roll and a backup roll and is embossed by being heated while in contact with the heated engraved roll. The resultant embossed film usually has a shallow and poorly defined pattern. An example of an apparatus and process for carrying out embossing of this type is shown in U.S. Pat. No. 3,176,058.

Another apparatus for embossing thermoplastic film used heretofore includes a heated roll or a series of heated rolls to heat the film to a softened state. The heated film is then fed to an embossing roll and pressed against the embossing roll by a backup roll. Normally, the embossing roll and the backup roll are cooled in order to set the embossed pattern into the film so that it may be immediately wound up into rolls, if desired. An apparatus for embossing film using heated rolls is shown in U.S. Pat. No. 3,246,365.

One of the drawbacks when using the heated roll or drum apparatus to apply heat to the film prior to embossing is the difficulty in heating the film to a sufficiently high temperature so that it will take a deep, permanent embossed pattern which is a true reproduction of the engraved surface of the engraving roll. If the film is heated to a sufficiently high temperature to obtain a very deep and permanent impression when pressed against the engraving roll, oftentimes the film will stick or adhere to the heating rolls, thus causing tears or slack or drape problems in handling the films between the heating rolls and the embossing rolls. Since the film cannot be heated to the desired temperature using heated rolls, this results in a loss of the density depression which is desired oftentimes to produce very soft, flexible film. The density depression that can be produced when embossing a film is a direct measure of the temperature differential existing between the heated film and the cold embossing rolls.

Thus, it can be seen that the film embossing art is in need of an apparatus whereby preformed thermoplastic film can be rapidly heated to a sufficiently high temperature to obtain a deep, permanent, embossed pattern on the film and yet which will provide wide variation in control of the parameters which establish the physical properties of the embossed film, i.e., modulus, surface gloss, embossed pattern depth, tensile strength and impact strength.

SUMMARY OF THE INVENTION

It is an object of the present invention to provide an improved method and apparatus for producing embossed thermoplastic film which permits wide variation of the physical properties of the embossed film.

It is a further object of the present invention to provide a method and apparatus for the manufacture of embossed thermoplastic films which can be used to produce "in line" embossed thermoplastic films.

It is a still further object of the present invention to provide an apparatus for embossing film which utilizes heated air as the heat source.

It is another object of the present invention to provide an apparatus for embossing film which utilizes external blowers and heating elements for producing the hot air used to heat the film.

It is still another object of the present invention to provide a method and apparatus for embossing thermoplastic film which may be readily adapted for use in existing embossed film lines.

The apparatus aspects of the present invention for embossing thermoplastic film may be carried out by providing means for supplying a moving, continuous, preformed length of film and means for producing a supply stream of heated air. Means are provided for applying the stream of heated air to a selected area on each side of the film to raise the temperature of the film to its softening point. Means are provided for recycling at least a portion of the stream of heated air from the applying means to the producing means. Means are provided for embossing a pattern on the soft film. Means are also provided to cool the film substantially below its softening point after embossing to set the pattern in the film.

The method aspects of the present invention may be carried out in a method for preparing embossed thermoplastic film including passing a length of film at a temperature below its softening point through a heating zone. Heat is applied to at least one side of the film as it passes through the heating zone by contacting the film with a flowing stream of heated air to raise the temperature of the film above its softening point. A substantial portion of the heated air is removed from the heating zone after it has contacted the film. The removed air is reheated at a location separate from the heating zone. The reheated air is then returned to the heating zone. After the film exits from the heating zone, a pattern is embossed on the heated film and the film is then cooled to set the pattern therein.

The apparatus of the present invention is particularly suited for in line embossing of films produced by the blown bubble process using in annular extrusion die, for example, film produced by the process and apparatus set forth in U.S. Pat. No. 2,632,206, the disclosure of which is hereby incorporated herein by reference.

DESCRIPTION OF THE PREFERRED EMBODIMENTS

Figure 1:
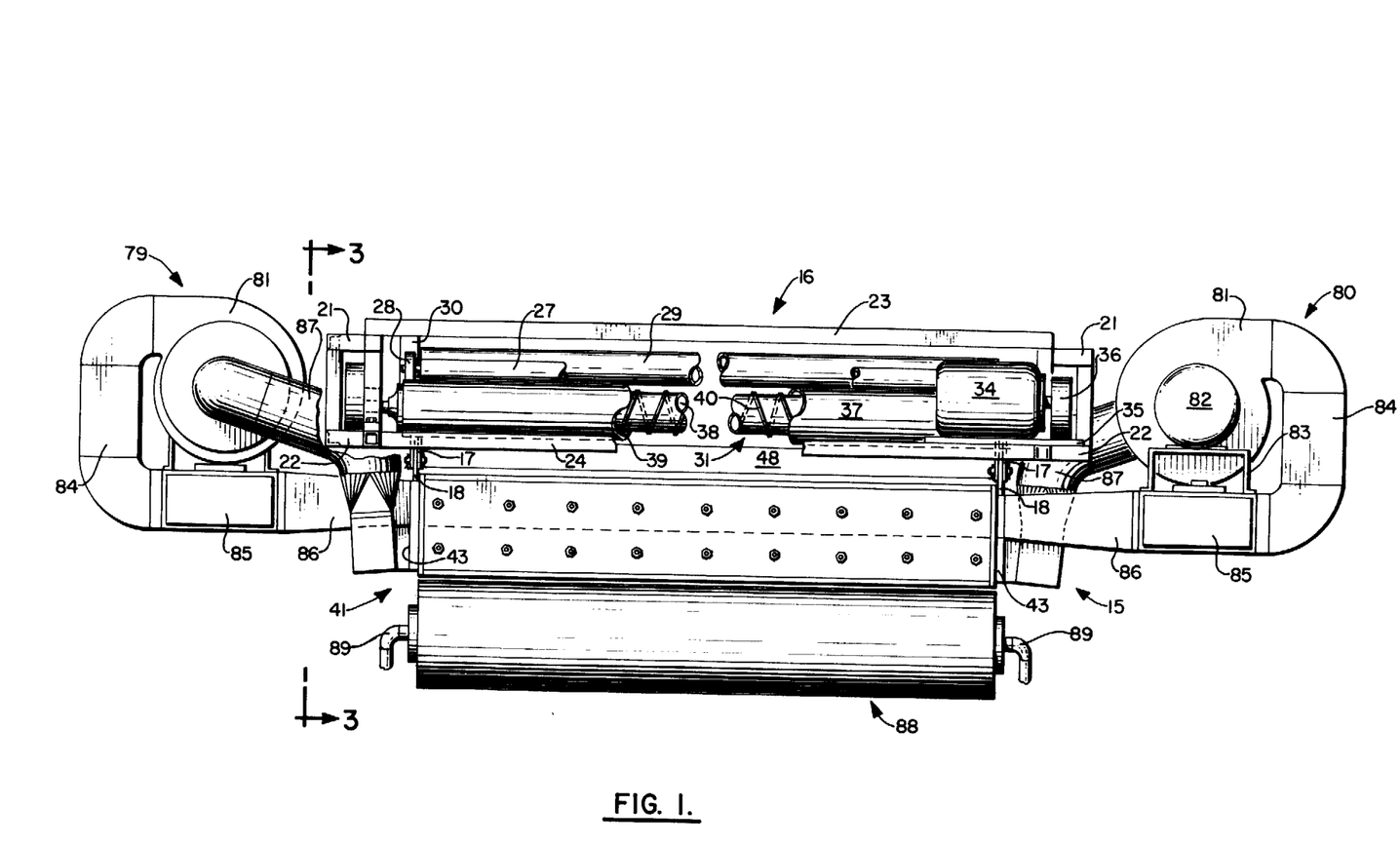
FIG. 1 is a front elevational view of an apparatus constructed in accordance with the present invention for producing thermoplastic embossed film.
Figure 2:
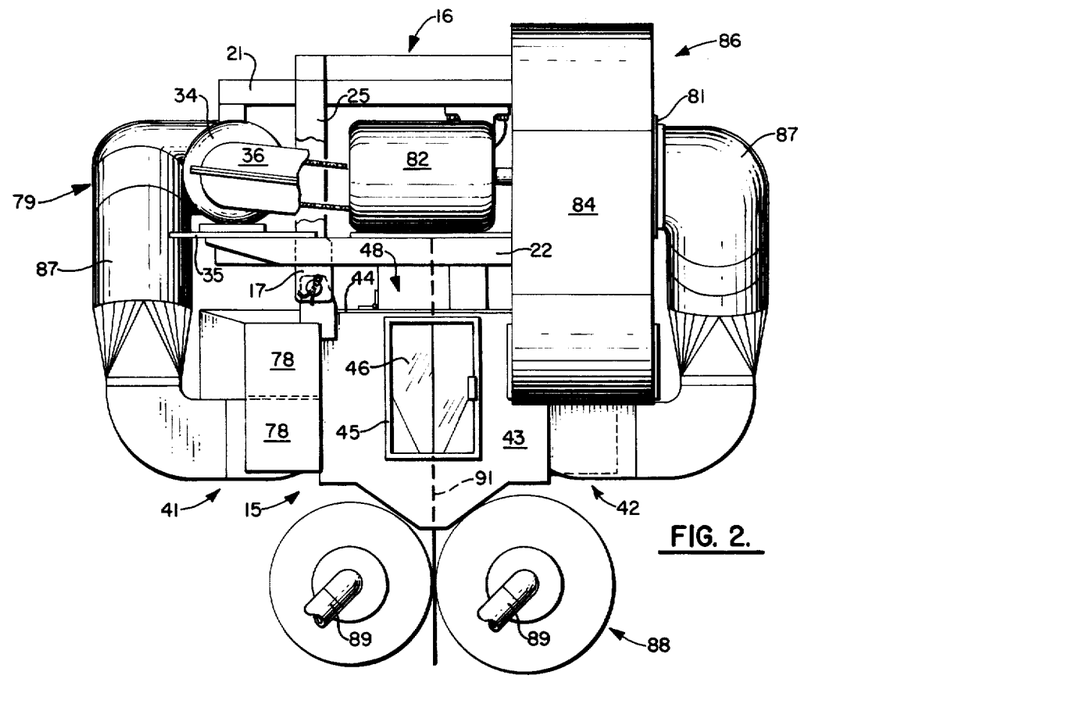
FIG. 2 is a right-hand-side, elevational view of the apparatus of FIG. 1.
Figure 3:
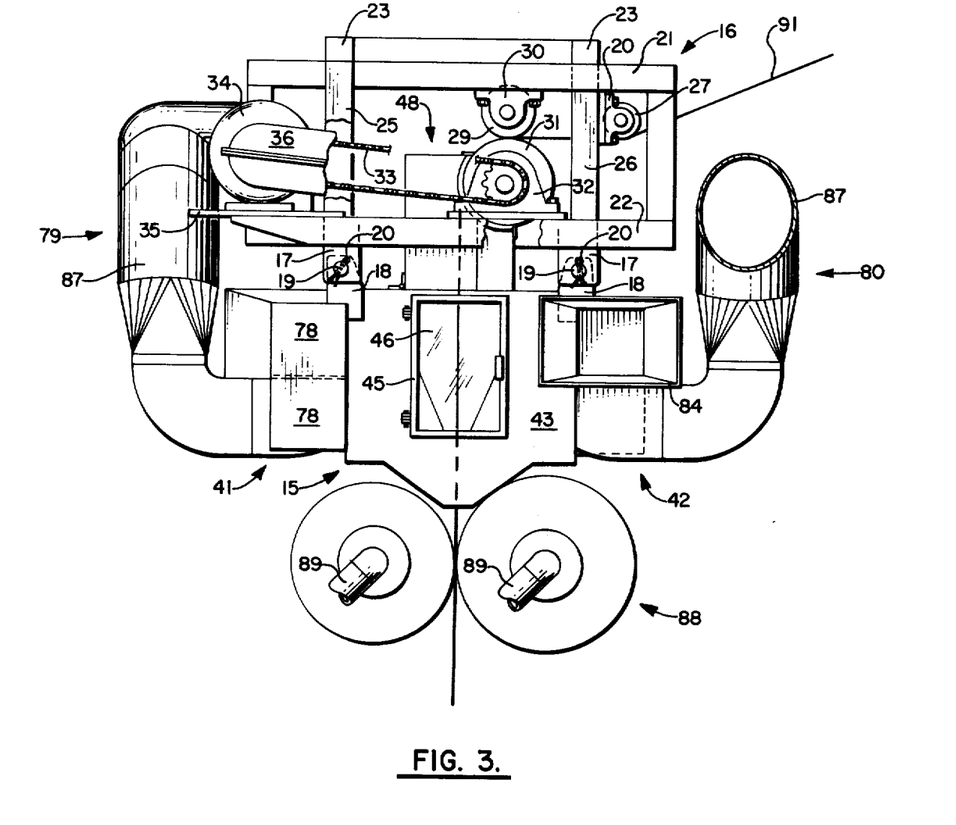
FIG. 3 is an elevational, sectional view along the line 3—3 of the apparatus of FIG. 1.

Referring now to FIGS. 1, 2 and 3, the embossing apparatus of the present invention utilizes a heated air supply assembly, designated generally by the numeral 15, which is suspended from and removably attached to a generally rectangular support frame, designated generally by the numeral 16. As seen in FIG. 3, the support frame is provided with two spaced apart flanges 17—17 which extend downwardly at each end thereof. Spaced apart brackets 18—18 are provided at each end of the heated air supply assembly 15 and are attached to the flanges 17—17 by means of pins 19—19 secured by cotter pins 20—20. The frame includes two sets of spaced apart upper cross members 21 and 22 at each end thereof. The cross members are connected to respective sets of upper and lower longitudinal strut members 23—23 and 24—24 which compose a part of the frame. Vertical members 25 and 26 are provided on each end of the frame and are attached to the upper longitudinal members 23—23 and the lower longitudinal members 24—24 at each end thereof.

An idler roll 27 is mounted on the vertical members 26—26 by means of bearing blocks 28—28. Press roll 29 is mounted on bearing blocks 30—30 which are attached to the cross members 21—21. Driven roll 31 is mounted on bearing blocks 32—32 carried by cross members 22—22. The driven roll is driven by means of a chain 33 connected to an electric motor 34 which is mounted on plate 35 affixed to the cross member 22 and longitudinal member 24. Chain guard cover 36 is attached to the motor and bearing block 32 to protect the operator from becoming entangled with the moving chain.

As seen in FIG. 1, the driven roll 31 includes a hollow, cylindrical, outer portion 37 and a smaller diameter, inner, tubular section 38 axially positioned to provide an annulus 39 between the inner and outer portions of the roll 31. Spiral rib 40 is affixed to the outer surface of the tubular section 38.

Figure 4:
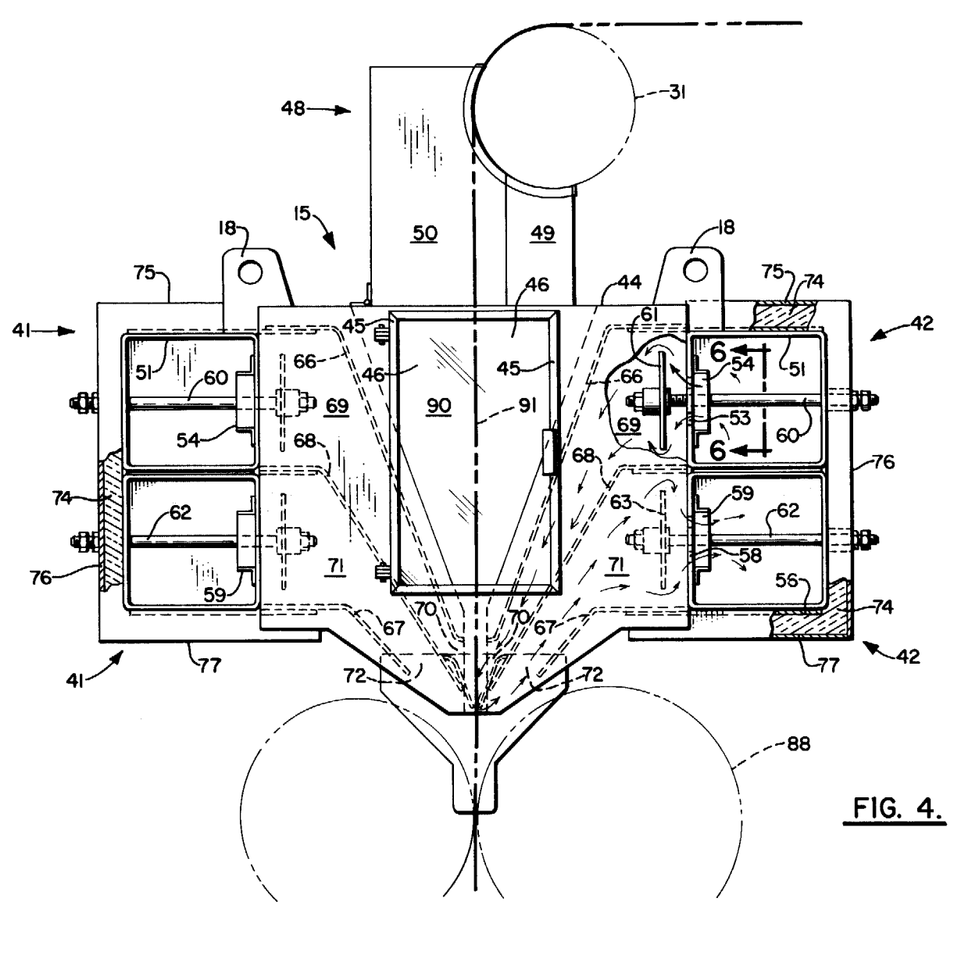
FIG. 4 is a side elevational view, partially broken, of the two heated air supply ovens utilized in the apparatus of the present invention.
Figure 5:
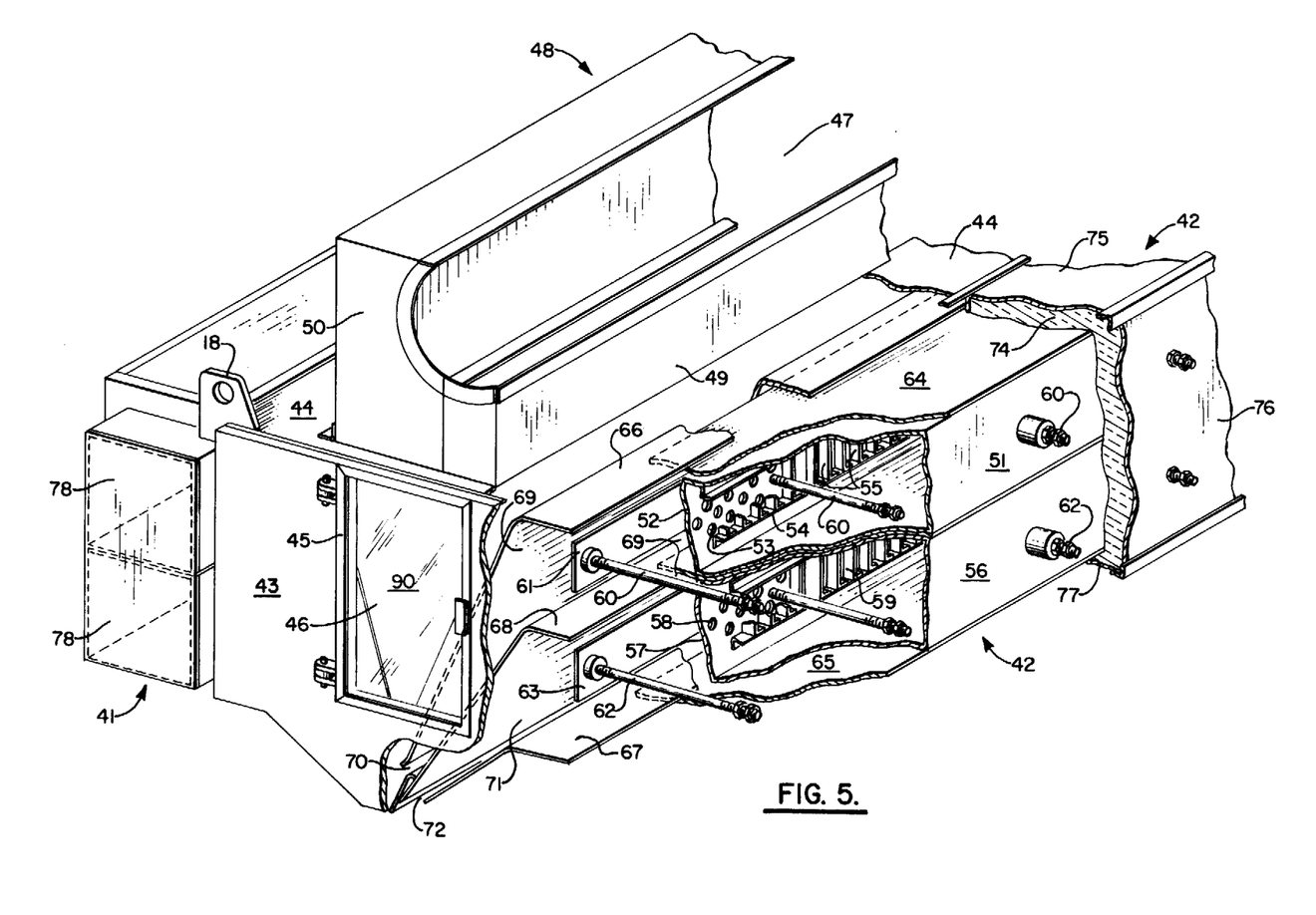
FIG. 5 is a perspective, elevational, partially broken view of the air ovens and cover assembly used in the embossing apparatus of the present invention.

As seen more clearly in FIGS. 4 and 5, the heated air supply assembly 15 includes a left-hand heated air oven, designated generally by the numeral 41, and a right-hand heated air oven, designated generally by the numeral 42. The two air ovens are removably coupled together by means of end walls 43—43 and a top wall 44 (as can be seen more clearly in FIG. 5). Each end wall is equipped with a door 45 having a transparent window 46 therein.

Referring now to FIG. 5, the top wall 44 is provided with a longitudinally extending, generally rectangular opening 47 which is covered by a housing, designated generally 48, that is adapted to encompass a portion of the cylindrical surface of the heater roll 31. The housing includes a fixed right-hand portion 49 and a movable left-hand portion 50 which is hingedly connected to the top wall 44.

Figure 6:
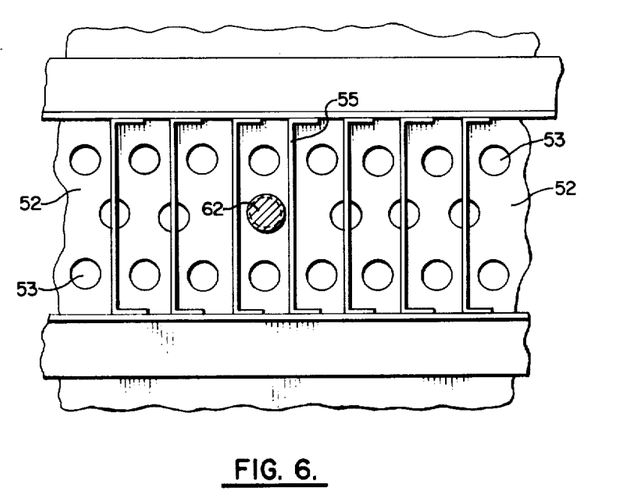
FIG. 6 is an enlarged, sectional view of a portion of the apparatus of FIG. 4 taken along the line 6—6.

Referring now to FIGS. 4 and 5, left-hand hot air oven 41 and the right-hand hot air oven 42 have identical constructions so that the same reference numerals will be used in referring to the two events. Each oven includes a generally rectangular, elongated, hollow, heated air inlet chamber 51. Inner wall 52 of the chamber 51 is provided with a plurality of openings 53 therethrough. Inside of wall 52 has attached thereto by welding or other suitable means a louver structure 54 containing a series of spaced apart, vertically extending louvers 55, as may be seen more clearly in FIG. 6. An elongated, generally rectangular, hollow, heated air outlet, or return, chamber 56 is located below the inlet chamber 51 and is provided with an inner wall 57 having a plurality of openings 58 therein. Louver structure 59, having a construction as described above in connection with the louver structure 54, is attached to the wall 57. A plurality of spaced apart, upper threaded bolts 60 extend transversely through the inlet chamber 51 and extend through wall 52 to provide support for a generally rectangular, elongated baffle plate 61 which is attached to the inner end of the bolts. A like series of lower threaded bolts 62 extend transversely through the heated air outlet chamber 56 and carry a baffle plate 63 on their inner ends. Generally rectangular, flat, upper, cover plate 64 is attached to the top wall of the heated inlet chamber 51 and a like lower cover plate 65 is attached to the bottom wall of the heated air outlet chamber 56. Each of these cover plates extend inwardly past the edge of the respective chambers. A downwardly directed, upper air deflector structure 66 has its upper end attached to the outwardly extending portion of the upper cover plate 64. A lower air deflector structure 67 has its upper end attached to the lower plate 65. An intermediate, downturned, deflector structure 68 has its upper end attached to a support plate 69 which is positioned between the lower surface of the inlet chamber 51 and the upper surface of outlet chamber 56 and has its inturned edge attached thereto. Deflector structures 66 and 68 extend between the two endwalls 43—43 and define the heated air inlet duct space, designated by the numeral 69. The heated air duct terminates in a narrow, rectangular, horizontally extending slot 70. Lower deflector structure 67, together with intermediate structure 68, defines the return air duct space 71 therebetween. The lower ends of the structures 67 and 68 define a narrow, rectangular, horizontally extending return air gap 72. A longitudinally extending reinforcing strip 73 is attached to the terminal end of intermediate structure 68 to provide reinforcement thereto. Each heated air inlet chamber 51 and outlet chamber 56 is covered by a layer of insulation 74, which may be fiberglass, asbestos, or other suitable material, and which is retained in place by light sheet metal top wall 75, sidewall 76, and bottom wall 77. Each end wall 43 is also provided with an inner layer of insulation (not shown). Each of the chambers 51 and 56 are closed at their ends by means of removable end caps 78—78.

Referring now to FIGS. 1, 2 and 3, the left-hand hot air oven 41 is provided with a heated air supply and return assembly, designated generally by the numeral 79. Likewise, the right-hand hot air oven 42 is provided with an identical heated air supply and return assembly 80. Since these assemblies are identical in construction and operation, the same reference numerals will be used for like components of each assembly, and only one assembly will be described.

Each assembly includes a blower fan 81 driven by an electric motor 82 which is supported by a bracket 83. Each blower fan 81 outlet is connected by means of a U-shaped conduit 84 to a heater assembly 85 which is, in turn, connected by conduit 86 to the inlet end of the inlet heated air chamber 51. A recirculating air return conduit 87 is connected to one end of the heated air outlet chamber 56 and to the intake for the fan 81.

The heater assembly 85 may utilize electrical or fuel (e.g., gas or oil) powered heating elements for heating the recirculated air. Preferably, the assembly utilizes electrically powered resistance heaters (not shown) such as those sold under the trademarks Calrod or Cromalox. Particularly suitable electrical resistance heating units are the Cromalox duct heating units manufactured and sold by Wiegand Co., Pittsburgh, Pa., Catalog Nos. TDH-42C and TDH-54C. However, any other suitable electrical or fuel powered heating means may be utilized, if desired.

Positioned below the heated air supply 15 is a pair of counter-rotating embossing rolls, designated generally 88. The rolls are mounted on a conventional support assembly (not shown) and may be driven by a suitable drive mechanism (not shown). Each roll is provided with a conduit 89 at each end for the circulation of cooling fluid through the roll, if desired. Preferably, one of the rolls is an engraved metal roll having a pattern on its outer cylindrical surface of the type desired to emboss into the thermoplastic film (preferably a male pattern). The other roll is preferably covered with a resilient covering (rubber, neoprene, Silastic) and is adapted to be pressure loaded to press the thermoplastic web against the embossing steel roll. It is understood that twin metal rolls may be used, each of which has an embossed pattern on its surface, one being male and the other being female, to impress the pattern into the thermoplastic film.

In operation of the apparatus of the present invention, a preformed, thermoplastic, flexible sheet material (polyethylene, polypropylene, polyvinyl chloride) 91 is fed from a supply source (not shown) which may be a roll of material or a web derived from slitting a tubular film produced by the blown bubble process as referred to hereinbefore. The film 91 first passes over idler roll 27 and then into the nip created by the press roll 29 and driven roll 31. The driven roll 31 is preferably heated by steam, hot oil or other fluids by flowing it through the annular space 39 provided therein. Preheated film then leaves the driven roll 31 and enters the housing 48 where it is exposed to the hot air from the left-hand and right-hand hot air ovens 41 and 42. The film passes on down through the heating zone 90 which is the space enclosed and defined between ovens 41 and 42, as may be seen more clearly in FIG. 4. The film passes freely between these ovens where, in the lower regions, it is exposed to a high velocity blast of heated air as it is expressed from the slot 70 of the heated air space 69. Both sides of the film are thus exposed to an intensively heated, uniformly flowing, rectangularly shaped jet of hot air, thereby increasing the temperature of the plastic film 91 to a temperature preferably above its softening point whereby it can be embossed. The film next passes between the nips of the embossing rolls, and the embossing pattern is set therein as the film is cooled by the cooling surfaces of the embossing roll and/or backup roll. As seen in FIGS. 4, the air is retained within the space 90 and is sucked back up in the slots 72—72 of the return air space and returned through heated air return ducts 71—71. The recycle of returned air is then pulled back into the heated air outlet or return chamber 56 where it is returned to the fan for recirculation over the heater and back into the heated air inlet chamber 51 for reapplication to the advancing film.

The method and apparatus of the present invention provide a highly efficient, versatile and flexible system for producing embossed thermoplastic film. The hot air ovens of the present apparatus, after construction, may be coupled together by use of the end plates 43 and readily attached to a supporting structure for installation over existing embossing rolls. The present apparatus provides a high degree of heat input to the thermoplastic film, yet does not allow the film to directly contact any solid surface which might produce sticking or tearing of the film prior to engagement with the embossing rolls. The apparatus of the present invention also provides for an extremely high velocity, high heat content source of air which is applied in an extremely uniform, diffused state over the opposed two surfaces of the film, thus permitting the film to be rapidly heated to its embossing temperature. Another advantageous feature of the apparatus of the present invention is the location of the heating system, e.g., electric heaters, steam heaters, etc., outside of the hot air ovens whereby this assembly may be readily maintained and replaced if needed. Additionally, the apparatus provides for a completely external system for the circulation of the heated air and for returning the used air to the heating system whereby an extremely efficient heating operation is achieved.

The method of the present invention permits the production of an extremely good patterned embossed film which has little or no tendency to curl, has very good moduli, has low surface gloss or light reflectance, has a deep embossed pattern and high tensile and impact strengths.

While the most preferred form of the present invention utilizes two opposed heated air supply sources, it is not necessary that two sources be used. The invention is operable with one source when the characteristics of the film are such that heat may be applied sufficiently by use of one hot air oven to only one side of the film.

While there has been described what is at present considered preferred embodiments of the present invention, it will be apparent to those skilled in the art that various modifications and changes may be made without departing from the essence of the invention. It is intended to cover herein all such modifications as come within the true scope and spirit of the following claims.

What is claimed is:

1. In an apparatus for heating thermoplastic film, the combination comprising:
   a. a pair of opposed heated air supply ovens defining therebetween a vertically extending, enclosed heating zone adapted to heat said film to its softening point as it passes through said zone, each of said heated air supply ovens including,
      i. a horizontally extending, elongated, heated air inlet chamber provided with a wall having perforations therein,
      ii. a horizontally extending, elongated, heated air return chamber provided with a wall having perforations therein mounted below said heated air inlet chamber,
      iii. a downwardly directed heated air supply duct defined by the space between an upper air deflector structure having its upper end attached to the top of said perforated wall of said heated air inlet chamber, and an intermediate air deflector structure having its upper end attached between the lower end of said heated air supply chamber and the upper end of said heated air return chamber,
      iv. a downwardly directed return air duct defined by the space between a lower air deflector structure having its upper end attached to the lower end of said perforated wall on said heated air return chamber and said intermediate air deflector structure;
   b. a common end wall attached to each end of the two ovens; and
   c. a common top wall attached to the tops of both ovens, said top wall having an opening therein to receive said film.

2. In the apparatus of claim 1 wherein said heated air inlet duct terminates in a narrow, horizontally extending, rectangular slot.

3. In the apparatus of claim 1 wherein each of said perforated walls of said inlet and said outlet chambers are provided with a plurality of spaced apart, vertically extending louvers.

4. In the apparatus of claim 3 wherein an adjustable baffle plate is spaced from each of said perforated walls on the side opposite said louvers.

5. In an apparatus for embossing thermoplastic film, the combination comprising:
   a. means for guiding and moving a continuous, vertically extending, preformed length of said film into a vertically extending heating zone;
   b. a pair of opposed, heated air supply ovens defining therebetween said heating zone for heating said film to a temperature above its softening point, each of said ovens including an elongated, heated air inlet chamber terminating in a narrow, rectangular, horizontally extending heated air exit slot, and an elongated return air chamber terminating in a narrow, rectangular, horizontally extending return air gap, said return air gap being positioned below and adjacent to said heated air exit slot;
   c. conduit means outside of each of said air supply ovens connecting said return air chamber to said heated air inlet chamber;
   d. circulating means outside of said supply ovens in each of said conduit means for circulating heated air through each one of said supply ovens;
   e. heating means in said conduit means for heating said air;
   f. a pair of opposed, counter-rotating, film-contacting, embossing rolls positioned immediately adjacent to said heated air exit slot and said return air gap of each of said supply ovens so that air is blown against said film immediately before said film contacts said embossing rolls, said embossing rolls receiving said heated film for embossing a pattern thereon and for deflecting air from said heated air exit slot to said return air gap for each of said supply ovens; and
   g. means to cool said film substantially below its softening point to fix said embossed pattern in said film.

6. In the apparatus of claim 5, wherein means for enclosing said heating zone are provided, said enclosing means having openings at its top and bottom for entry and exit of said film to and from said heating zone.

7. In the apparatus of claim 6 wherein said means of subparagraph a) includes a pair of normally contacting pull rolls and means to drive said rolls.

8. In the apparatus of claim 7 wherein said enclosing means includes a housing positioned adjacent at least one of said pull rolls and providing the opening for the entry of said film into said heating zone.

9. In the apparatus of claim 5, wherein at least one of said embossing rolls is hollow and said means to cool said film includes means for supplying a flow of cooling fluid to said at least one of said embossing rolls.

10. In the apparatus of claim 5, wherein said means of subparagraph c) includes a fan for each of said heated air supply ovens.

11. In the apparatus of claim 5 wherein said heating means includes at least one electrically powered heating element.

12. In the apparatus of claim 5 wherein each of said heated air supply ovens is provided with adjustable means for diffusing the heated air supplied to said heating zone.

13. In the apparatus of claim 12 wherein said diffusing means includes a plurality of vertically extending louvers are mounted adjacent a wall provided with a plurality of openings therein.

14. In the apparatus of claim 13 wherein an adjustable baffle is spaced from said wall on the side opposite said louvers.

* * * * *

UNITED STATES PATENT OFFICE
CERTIFICATE OF CORRECTION

PATENT NO. : 3,894,827
DATED : July 15, 1975
INVENTOR(S) : Garland E. Raley, et al It is certified that error appears in the above-identified patent and that said Letters Patent are hereby corrected as shown below:

Col. 1, line 26, reads "clothwise", should read -- clothlike --. Col. 4, line 59, reads "events", should read -- ovens --.

Signed and Sealed this

Thirteenth Day of July 1976

[SEAL]

Attest:

RUTH C. MASON
Attesting Officer

C. MARSHALL DANN
Commissioner of Patents and Trademarks